(12) United States Patent
Kodama (10) Patent No.: US 6,189,060 B1
(45) Date of Patent: Feb. 13, 2001

(54) TRANSMITTING DEVICE, SERVER DEVICE AND TRANSMITTING METHOD

(75) Inventor: Yasumasa Kodama, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 08/992,662

(22) Filed: Dec. 17, 1997

(30) Foreign Application Priority Data

Dec. 19, 1996 (JP) .................................................. 8-354428

(51) Int. Cl.⁷ .................................................. G06F 13/16
(52) U.S. Cl. .......................... 710/108; 710/129; 709/301
(58) Field of Search .................................. 710/129, 107, 710/108, 29, 301, 217

(56) References Cited

U.S. PATENT DOCUMENTS

| | | | |
|---|---|---|---|
| 5,467,295 | * 11/1995 | Young et al. | 395/200.05 |
| 5,862,353 | * 1/1999 | Revilla et al. | 395/287 |
| 5,887,194 | * 3/1999 | Carson et al. | 395/856 |
| 5,911,055 | * 6/1999 | Whiteman et al. | 395/309 |

* cited by examiner

*Primary Examiner*—Andrew I. Faile
(74) *Attorney, Agent, or Firm*—Frommer Lawrence & Haug, LLP.; William S. Frommer; Bruno Polito (57) ABSTRACT

A transmitting device capable of transmitting video data with high speed has been disclosed. When transmitting video data, by providing a transmitting circuit for invalidating a time out signal of a timer which counts the occupied time of a bus, the video data having large volume of information can be successively transmitted by continuously using the bus, and thus the video data can be transmitted with high speed.

5 Claims, 5 Drawing Sheets

TRANSMITTING DEVICE, SERVER DEVICE AND TRANSMITTING METHOD

BACKGROUND OF THE INVENTION

1. Field of the Invention

The present invention relates to a transmitting device, a server device and a transmitting method, and is suitably applied to a video server device for transmitting video data.

2. Description of the Related Art

In a video server device, the processing for transmitting video data encoded by an encoder to a hard disk drive to record on a hard disk, and the processing, by reading out and transmitting the video data from the hard disk to a decoder, for decoding and outputting the video data, are conducted.

At this time, the video data is transmitted via a data bus such as a Versa Module European (VME) bus which connects a Central Process Unit (CPU), the hard disk drive, and each device of a video server device, i.e., an encoder, a decoder.

By the way, as the video server device having the above construction, the case of using the VME bus for transmission of video data has a problem that the transmission of video data takes a lot of time because the transmission speed of the VME bus is 50[MByte/s] degree even in maximum.

As methods of solving this, a method of newly planning and using a high-speed dedicated bus to transmit the video data can be considered. However, in this method the existing hard disk drive, encoder and decoder are not able to be connected, thereby an inconvenience occurs in general purpose.

Further, as a second solving method, a method of using a peripheral component interconnect (PCI) bus having the maximum transmission speed 133[MByte/s], which has recently developed as an internal bus of computer system, can be considered. However, since the PCI bus has developed as the internal bus of a computer system, the bus occupied time of the PCI bus is predetermined, so that the data having large volume of information such as video data can not be successively transmitted at once, thus an inconvenience that the video data can not be efficiently transmitted occurs.

Nevertheless, since the PCI bus has general purpose characteristic, if the point in that data can not be successively transmitted were solved, a data bus capable of high-speed transmitting video data and having general purpose characteristic would be realized; and a video server device capable of high-speed transmitting video data seems to be realized.

SUMMARY OF THE INVENTION

In view of the foregoing, an object of this invention is to provide a transmitting device capable of high-speed transmitting video data, a server device using it, and its transmitting method.

The foregoing object and other objects of the invention have been achieved by the provision of a transmitting device having a bus formed by multiple signal lines, a transmitter circuit for transmitting data by driving the bus, and a receiver circuit for receiving the data supplied via the bus. In the case of transmitting video data as data, the transmitter circuit invalidates the time out signal that is supplied by a timer for counting the occupied time of the bus to transmit the video data to the bus.

With this arrangement, when transmitting the video data, by invalidating the time out signal of the timer for counting the occupied time of the bus, the bus can be continuously used, and thus the video data having large volume of information can be successively and efficiently transmitted.

Furthermore, according to the present invention, in a transmitting method of transmitting video data via a bus, when utilizing the PCI bus as the bus to transmit video data, the time out signal that is supplied by a timer for counting the bus occupied time of the PCI bus is invalidated to transmit the video data to the PCI bus.

With this arrangement, when transmitting the video data, by invalidating the time out signal of the timer for counting the bus occupied time, the PCI bus can be continuously used, and thus the video data having large volume of information can be successively and efficiently transmitted.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
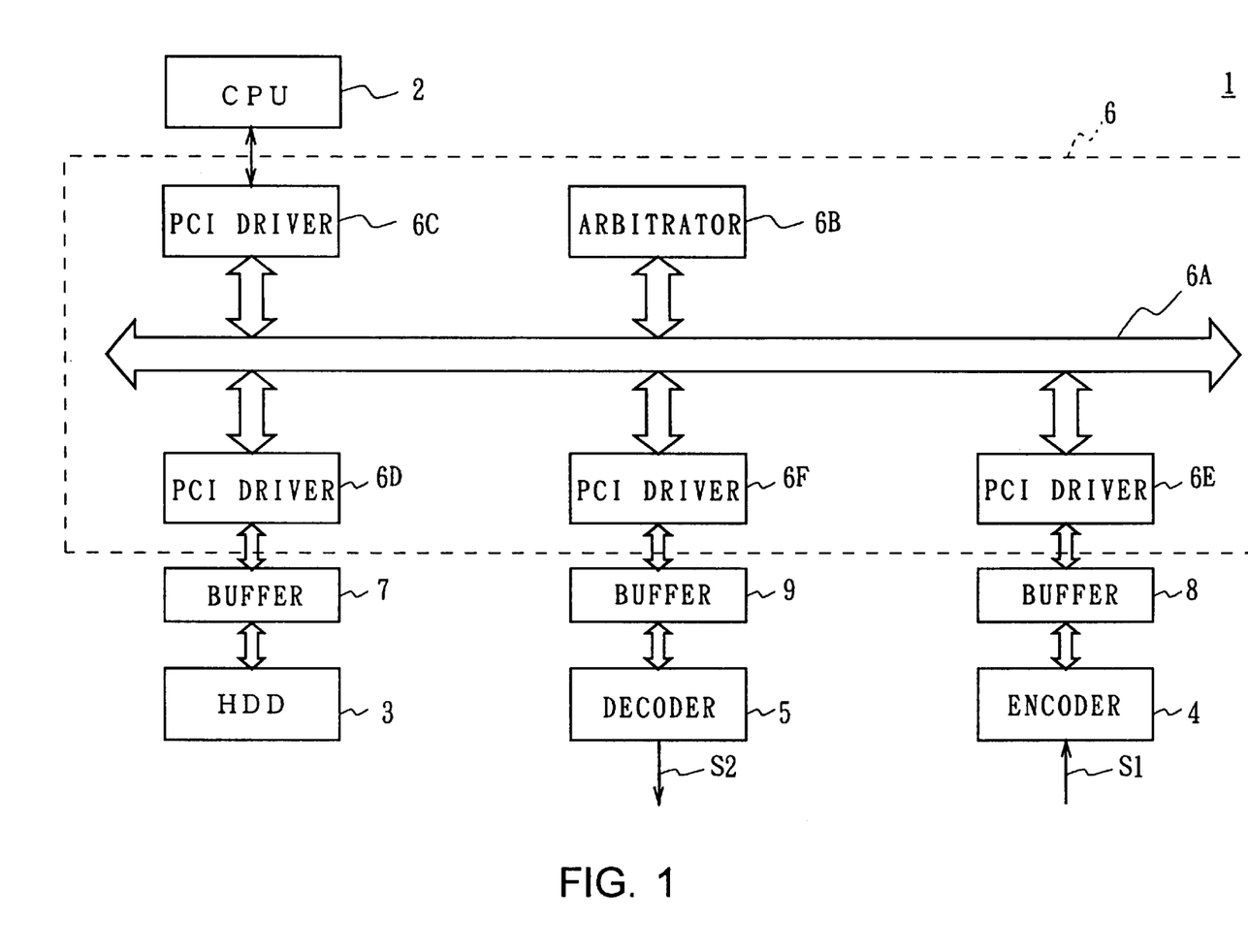
FIG. 1 is a block diagram showing one embodiment of a video server device of the present invention.

Preferred embodiments of this invention will be described with reference to the accompanying drawings:

In FIG. 1, numeral 1 generally shows a video server device to which the present invention has been applied, and has been provided with a CPU 2 as a control device, a hard disk drive (HDD) 3 as a recording/reproducing device, an encoder 4 as an encoding device, and a decoder 5 as a decoding device. In the video server device 1, the CPU 2, hard disk drive 3, encoder 4 and decoder 5 are respectively connected to each other via a PCI bus 6 as a transmitting device.

The CPU 2 is used to manage whole operation of the video server device 1. For example, to the hard disk drive 3, the CPU 2, by supplying control command data showing the write-in of data via the PCI bus 6, instructs to write video data on an inner hard disk, or by supplying control command data showing the read-out of data via the PCI bus 6, instructs to read the video data written on the hard disk. Thereby, the hard disk drive 3 reads the video data transmitted via the PCI bus 6 from a buffer 7 and records it to the hard disk, or reads the video data recorded on the hard disk and stores in the buffer 7 for data transmission to the decoder 5.

Furthermore, to the encoder 4, the CPU 2, by sending control command data showing encoding start via the PCI bus 6, instructs to start an encoding processing of video data. Thereby, the encoder 4 sequentially encodes the input video data S1 based on a prescribed encoding system, and stores the resultant encoded video data in the buffer 8 for data transmission to the hard disk drive 3.

Furthermore, to the decoder 5, the CPU 2, by supplying control command data showing decoding start via the PCI bus 6, instructs to start a decoding processing of video data. Thereby, the decoder 5 reads the video data transmitted via the PCI bus 6 from the buffer 9, sequentially decodes the video data based on a prescribed decoding system, and supplies the resultant decoded video data S2 to the fixed instrument.

In this connection, the hard disk drive 3, the encoder 4 and the decoder 5, after completing the processing respectively instructed, output command data showing processing completion to the CPU 2 via the PCI bus 6. Thereby, the CPU 2 can perceive completion of the instructed processing.

Furthermore, to the PCI bus 6, the CPU 2 instructs transmission of video data as described hereinafter other than the transmission of the control command data to each device described above (3, 4 and 5).

That is, the CPU 2, to the PCI bus 6, by sending the control command data showing data transmission of the video data, instructs to transmit the video data encoded by the encoder 4 to the hard disk drive 3. Thereby, the PCI bus 6 reads the encoded video data stored in the buffer 8 and transmits it to the buffer 7 of the hard disk drive side.

Furthermore, the CPU 2, to the PCI bus 6, by sending the control command data showing the data transmission of the video data, instructs to transmit the video data read from the hard disk drive 3 to the decoder 5. Thereby, the PCI bus 6 reads the video data stored in the buffer 7 and transmits it to the buffer 9 of the decoder side.

In this connection, when the data transmission is completed, the PCI bus 6 responds command data showing completion of the data transmission processing to the CPU 2. Thereby, the CPU 2 can confirm the completion of the data transmission instructed.

Note that, as obvious from the description heretofore, the buffers 7, 8 and 9, which are inserted between the PCI bus 6 and each device (3, 4 and 5), are memories for temporarily storing the data to be transmitted respectively. By providing the buffers 7, 8 and 9 for temporarily storing the data to be transmitted as above, the control of data transmission can be simplified as compared with the case of transmitting data as well as controlling each device (3, 4 and 5).

Next, the PCI bus 6 will be described concretely. The PCI bus 6 is provided with a bus 6A based on the PCI bus standard, an arbitrator 6B for arbitrating the right of use of the bus 6A, and PCI drivers 6C to 6F for driving the bus 6A.

The bus 6A is formed by multiple signal lines based on the PCI bus standard, and has at least 6 kinds of signal lines described hereinafter. Specifically, a first signal line is a signal line for clock (CLK) for transmitting a clock signal that is a reference clock in each operation in the PCI bus 6. Further, a second signal line is 32 pieces of signal lines for address data (AD[31:00]) for transmitting address data showing data to be transmitted and its destination. Furthermore, a third signal line is 4 pieces of signal lines for bus command (C/BE[3:0]#) for transmitting a bus command. Furthermore, a fourth signal line is a signal line for frame (FRAME#) for transmitting a frame signal showing that the PCI bus 6 is used. Furthermore, a fifth signal line is a signal line for request (REQ#) for transmitting a request signal used to request the right of use of the bus 6A. Moreover, a sixth signal line is a signal line for grant (GNT#) for transmitting a grant signal to the request signal.

The arbitrator 6B is an arbitrator circuit for arbitrating the right of use of bus 6A, and when the request signal is generated, it determines whether or not the use of the bus 6A is granted for the origin that generated the request signal. If the use of bus 6A is granted, the arbitrator 6B drives the grant signal line to output a grant signal as the response. Incidentally, the reason that the use of bus 6A is granted in this manner is why the bus 6A can not be used simultaneously at once by separate devices.

The PCI drivers 6C to 6F, as well as forming the transmitter circuit for transmitting data by driving the bus 6A, forms the receiver circuit for receiving data transmitted via the bus 6A. In the case of transmitting data via the bus 6A, the PCI driver (6C, 6D, 6E or 6F) of the receiving side first drives the request signal line to generate the request signal, and then when obtaining the grant signal from the arbitrator 6B as the response, the PCI driver (6C, 6D, 6E or 6F), as well as generating the bus command showing the write-in by driving the bus-command signal line, transmits the address data showing the transmitting position and the data to be transmitted by the signal line for address data. The PCI driver (6C, 6D, 6E or 6F) of the receiver side, as well as perceiving that oneself has been specified as the transmitting position by the address data supplied via the bus 6A, perceives the writing operation by the bus command, then receives the transmitted data to write in the buffer (7, 8 or 9). Thus the data transmission via the bus 6A is realized.

For instance, in the case of transmitting the video data read from the hard disk drive 3 to the decoder 5, the PCI driver 6D first generates the request signal, and when obtaining the grant signal from the arbitrator 6B, the PCI driver 6D, as well as transmitting the bus command showing the write-in by driving the bus-command signal line, transmits the address data showing the PCI driver 6F as the transmitting position and the video data to be transmitted that has been read from the buffer 7 by driving the address-data signal line. The PCI driver 6F which will be the transmitting position, as well as perceiving being the transmitting position by the address data, perceives that is the command for writing the video data to be transmitted hereafter by the bus command. Then the PCI driver 6F sequentially receives the video data transmitted via the bus 6A and sequentially writes in the buffer 9. Thereby, the video data read from the hard disk drive 3 is transmitted to the buffer 9 of the decoder side.

Note that, even in the case of transmitting the video data encoded by the encoder 4 to the hard disk drive 3 and the case of transmitting the control command data from the CPU 2 to the hard disk drive 3, the encoder 4 or the decoder 5, the data transmission processing will be performed almost in the same sequence.

By the way, since the PCI bus has been developed as an internal bus of a computer system, generally the PCI driver has a timer for counting the occupied time of the bus in it (hereinafter, referred to as latency timer), and when the latency timer becomes time out, the use of bus is stopped. Thus in a general PCI bus, video data can not be transmitted successively. Therefore, in the PCI bus 6 according to this embodiment, when transmitting video data, the time out signal of the latency timer is made to be invalid to make the bus 6A to be able to be used continuously, and thus the video data can be successively transmitted.

This respect will be described concretely hereinafter. However, in the following description, the side of generating the bus command by generating the request signal is called a master side, and the side of receiving the bus command is called a slave side.

Figure 2:
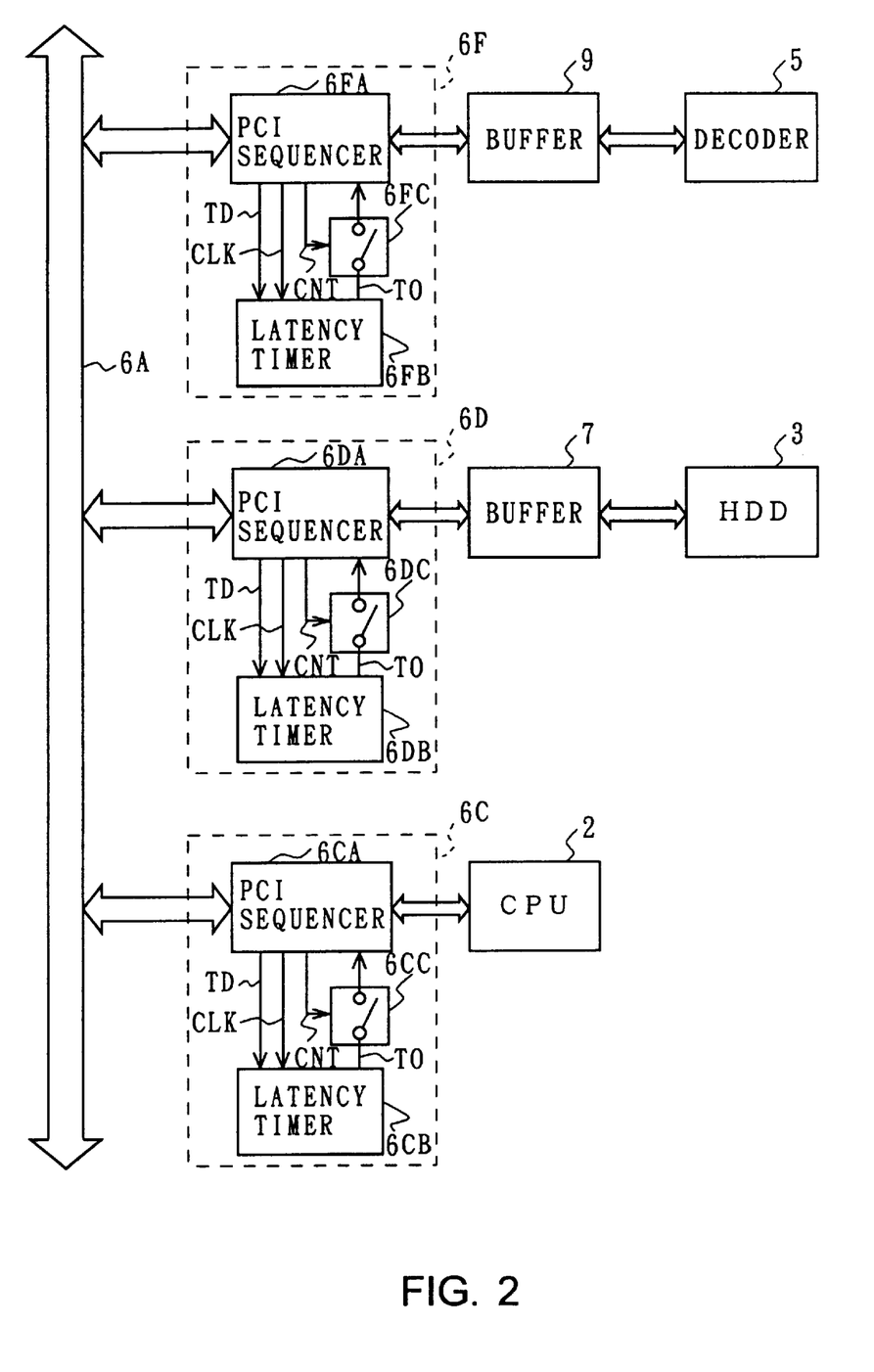
FIG. 2 is a block diagram illustrating the constitution of a PCI driver.

Generally in the case of data transmission in the PCI bus, the latency timer is started by the PCI driver of the master side, and when the latency timer becomes time out, the use of bus is stopped. Therefore, by making the time out of the latency timer to be invalid in the PCI driver of the master side, a PCI bus capable of successively transmitting can be realized. Then in the case of this embodiment, as shown in FIG. 2, a switch circuit has been provided in the PCI driver, thereby the time out signal of the latency timer is invalidated to successively transmit video data.

For example, the PCI driver 6D is composed of a PCI sequencer 6DA, a latency timer 6DB and a switch circuit 6DC. The PCI sequencer 6DA, when receiving the data to be transmitted as the slave side, receives the data transmitted by the bus 6A and stores it in the buffer 7.

On the other hand, when sending the data to be transmitted as the master side, the PCI sequencer 6DA, by reading the data from the buffer 7 and driving the bus 6A based on the data, sends the data to be transmitted. At this time, the PCI sequencer 6DA supplies a timer value TD and the clock signal CLK for driving the latency timer 6DB to the latency timer 6DB to start the latency timer 6DB.

The latency timer 6DB sequentially counts down from the timer value TD in order based on the clock signal CLK supplied, and when the count value reaches "0", it outputs a time out signal TO. The time out signal TO is supplied to the PCI sequencer 6DA via the switch circuit 6DC provided at the output stage of the latency timer 6DB. The PCI sequencer 6DA, on receiving the time out signal TO, stops the processing for sending the data to be transmitted to stop the use of the bus 6A.

By the way, the ON/OFF condition of the switch circuit 6DC will be controlled by a switch control signal CNT from the PCI sequencer 6DA. The PCI sequencer 6DA, in the case of sending the video data as data to be transmitted, outputs the switch control signal CNT showing the switch off to set the switch circuit 6DC into an OFF condition, and in the case of sending data other than the video data as data to be transmitted (i.e., in the case of sending the data having less data volume than the video data, such as the control command data for controlling each device (3, 4 and 5) and data other than that), outputs a switch control signal CNT showing the switch on to set the switch circuit 6DC into an ON condition. Thereby, in the case of sending the video data, the time out signal TO is invalidated and thus the occupied time of the bus can be invalidated. Note that, the judgment whether or not the video data is sent is determined according to the control command showing data transmission of the video data which is sent from the CPU 2.

Figure 3:
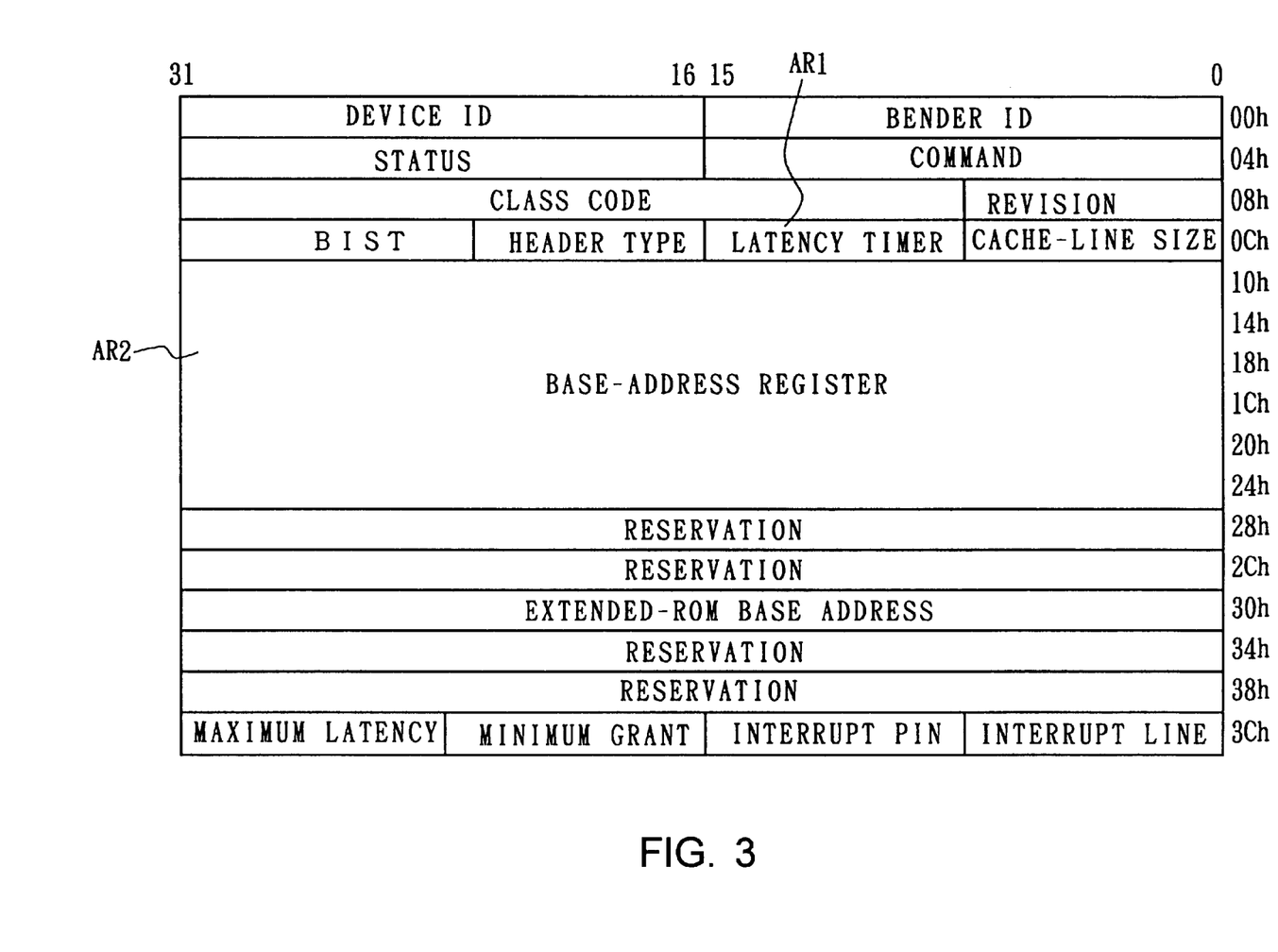
FIG. 3 is a schematic diagram explaining a configuration space header.

In this connection, the clock signal CLK which is supplied to the latency timer 6DB by the PCI sequencer 6DA is a clock signal synchronized with the clock signal of the bus 6A. Furthermore, the timer value TD supplied by the PCI sequencer 6DA is a timer value set to a configuration register in the PCI sequencer 6DA by the CPU 2 at the time of starting the video server device 1. Specifically, the memory space of the configuration register has the size of 256 bytes, and among of it, the first 64 bytes is called a configuration space header. The configuration space header, as shown in FIG. 3, will be allocated for the purpose of use by the byte, and 1-byte area AR1 shown by an 0Dh address is allocated for the timer value of the latency timer. That is, the value written in the area AR1 by the CPU 2 at the time of starting is used as the timer value TD. In this connection, since the area AR1 has 1 byte, the maximum timer value TD capable of setting becomes 256 clocks. In other words, in the case where the occupied time of the bus 6A is restricted by the latency timer 6DB, the data volume capable of transmitting becomes 256 words in maximum.

Note that, 24-byte area AR2 shown by the addresses 10h to 27h in the configuration space header is allocated for an area in which the address data of the PCI driver will be written. More specifically, the value written in this area AR2 by the CPU 2 at the time of starting becomes the address data of the PCI driver. In other words, the PCI driver of the master side supplies the address data written in the area AR2 as the address data showing the transmitting position, and the PCI driver of the slave side judges whether oneself has been specified or not on the basis of whether the supplied address data agrees with the address data written in the area AR2 or not.

With this arrangement, in the case of this embodiment, the switch circuit 6DC has been provided in the PCI driver 6D, and when transmitting video data, the switch circuit 6DC is set into an OFF condition to avoid supplying the time out signal TO of the latency timer 6DB to the PCI sequencer 6DA, thus the occupied time of the bus 6A is invalidated and the data can be successively transmitted.

Incidentally, also the PCI drivers 6C, 6E and 6F have the same configuration as the PCI driver 6D as shown in FIG. 2. However, all of the PCI drivers 6C, 6E and 6F, in the case of sending data as the master side, starts the latency timer, moreover in the case of sending video data, outputs the switch control signal CNT and sets the switch circuit into an OFF condition to avoid supplying the time out signal TO of the latency timer to the PCI sequencer; and thus the occupied time of the bus 6A is invalidated.

Figure 4:
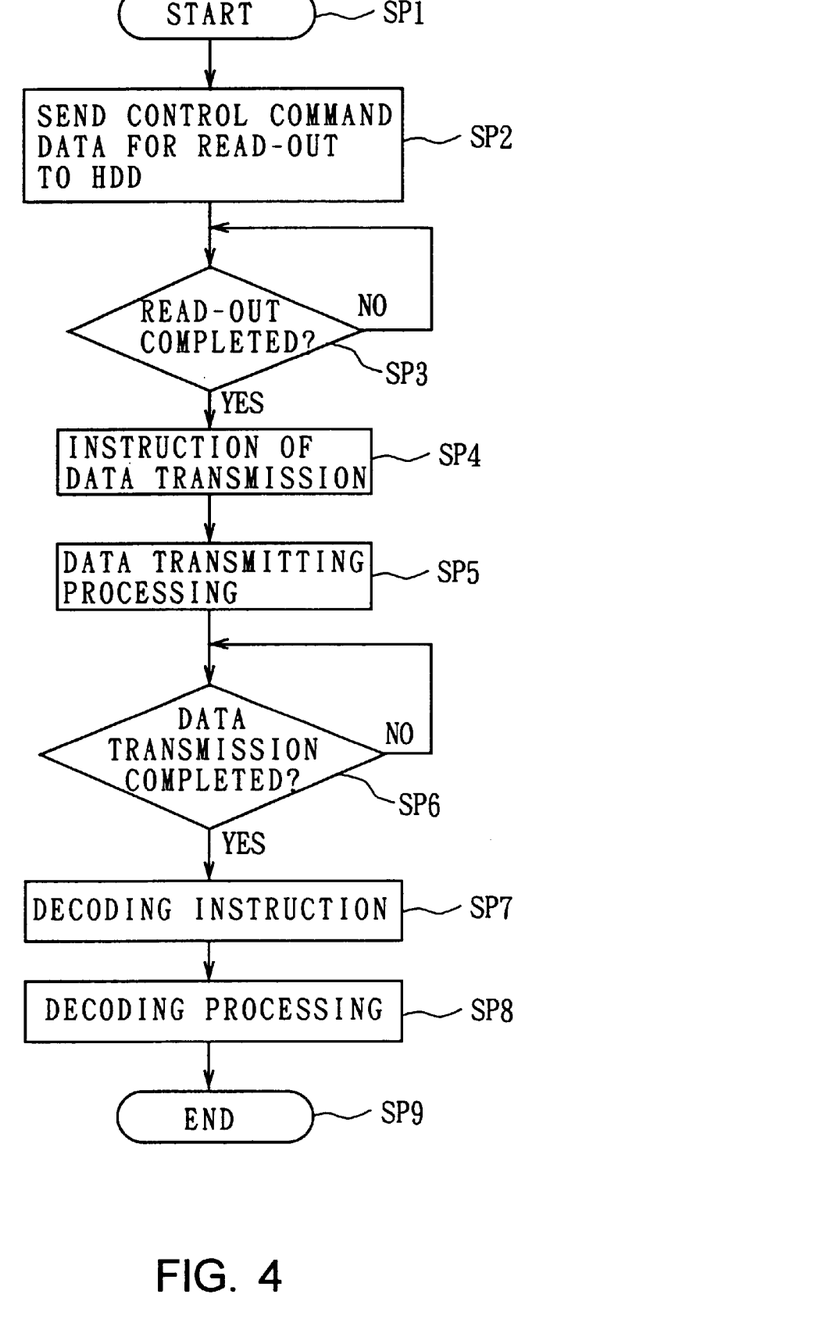
FIG. 4 is a flow chart explaining an operation at the time of transmitting video data from a hard disk drive to a decoder.

Here, as an example of transmitting the video data, the sequence of transmitting the video data from the hard disk drive 3 to the decoder 5 will be described referring to the flow chart shown in FIG. 4. First at step SP2 entered from step SP1, the CPU 2 sends the control command data showing the read-out to the hard disk drive 3 via the PCI bus 6. Accordingly, the hard disk drive 3 reads the video data from the inner hard disk according to the control command data and stores it in the buffer 7 for data transmission.

At the next step SP3, the CPU 2 judges whether or not the read processing of the video data by the hard disk drive 3 has been completed. This judgment is done based on the command data showing processing completion supplied from the hard disk drive 3. As a result of the judgment, if the read processing has been completed, it moves to the following step SP4, but if the read processing has not been completed, the judgment will be repeated until it is completed.

At the next step SP4, the CPU 2 sends the PCI driver 6D of the PCI bus 6 the control command data to transmit the video data to the decoder 5 side. Thus at the next step SP5, the data transmission processing of the video data is executed between the PCI driver 6D and the PCI driver 6F, and the video data stored in the buffer 7 is transmitted to the buffer 9 via the bus 6A. Note that, in the case of the data transmission processing is executed, the PCI driver 6D sets the switch circuit 6DC into an OFF condition so that the time out signal TO of the latency timer 6DB becomes invalid. Thus the time out signal TO of the latency timer 6DB becomes invalid and the video data can be successively transmitted.

At the next step SP6, the CPU 2 judges whether or not the data transmission of the video data by the PCI bus 6 has been completed. This judgment is done based on the command data showing the completion of the data transmission supplied from the PCI bus 6. As a result of the judgment, if the data transmission processing has been completed, it moves to the next step SP7, but if the data transmission processing has not been completed, the judgment will be repeated until it is completed.

At the next step SP7, the CPU 2 sends the control command data showing the start of decoding processing to the decoder 5 via the PCI bus 6. Thus at the next step SP8, the decoder 5 sequentially reads the video data from the buffer 9 based on the control command data and decodes the video data by executing the prescribed decoding processing. After this processing is completed, it moves to the next step SP9 and stops the processing procedure.

Here, the data transmission processing of the video data shown in the step SP5 will be described referring to the timing chart shown in FIGS. 5A to 5F. At first, when the PCI driver 6D, by driving the request signal line REQ# shown in FIG. 5B at the logic level "L", generates the request signal, the arbitrator 6B receives the request signal to judge whether or not the right of use of the bus 6A is granted. As a result, if granting it, the arbitrator 6B, by driving the grant signal line GNT# shown in FIG. 5C at the logic level "L" at the time $t_2$, generates a grant signal. Upon receiving this, the PCI driver 6D shows that uses the bus 6A by driving the frame signal line FRAME# shown in FIG. 5D at the level "L" at the time $t_3$. Furthermore, simultaneously, the PCI driver 6D, by driving the bus-command signal line C/BE[3:0] shown in FIG. 5F, as well as supplying the bus command "C" showing the write-in, by driving the address-data signal line AD[31:0] shown in FIG. 5E, supplies the address data "A" showing the PCI driver 6F and the video data "D" to be transmitted. Incidentally, as shown in FIGS. 5E and 5F, the address data and the bus command will be supplied only for one clock.

Furthermore, at this time, the PCI driver 6D starts the latency timer 6DB because of being on the master side, however, as conducting the data transmission of the video data, sets the switch circuit 6DC into an OFF condition so that the time out signal TO of the latency timer 6DB becomes invalid. Thereby, for example, at the time $t_4$, even if the latency timer 6DB is time out, the transmission processing of the video data can be continued. Thereafter if completing the transmission processing of the video data, for example, after driving the frame signal line FRAME# shown in FIG. 5D at the logic level "H" at the time $t_5$, the drive of the address data signal line AD[31:0] show in FIG. 5E may be stopped at the time $t_6$.

Figure 5A:
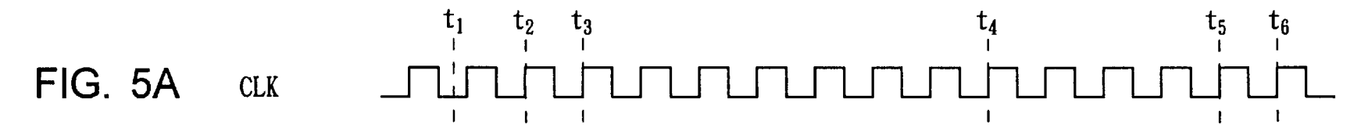
FIGS. 5A to 5F are timing charts explaining the timing of a PCI bus at the time of transmitting video data.
Figure 5B:
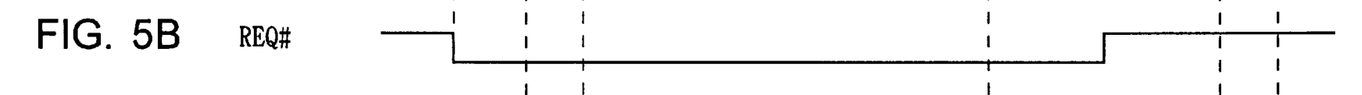
Figure 5C:
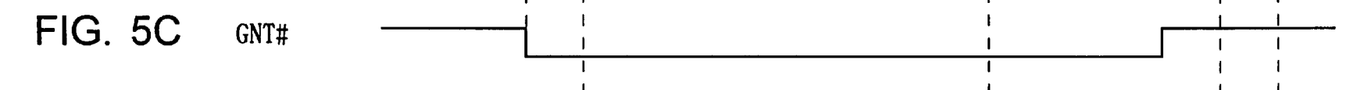
Figure 5D:
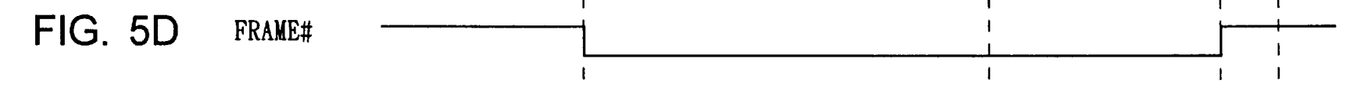
Figure 5E:
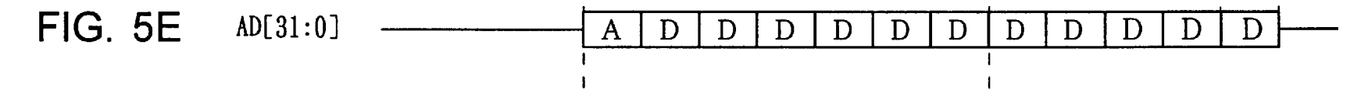
Figure 5F:
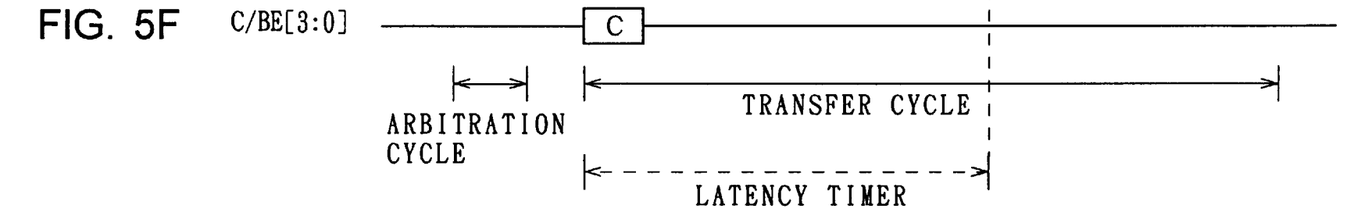

In this connection, the PCI driver 6F corresponding to the receiver side, as well as perceiving that oneself has been specified by the address data supplied via the address-data signal line AD[31:0] shown in FIG. 5E, perceives that the video data is written in the buffer 9 by the bus command showing the write-in supplied via the bus-command signal line C/BE[3:0] shown in FIG. 5E. Thereby, the PCI driver 6F receives the video data successively supplied and stores it in the buffer 9. With this arrangement, in the PCI bus 6 the transmission processing of video data will be conducted.

According to the construction described above, when the video data is transmitted via the PCI bus 6 in the video server device 1, the PCI driver becoming the master side starts the latency timer, however, at this time, by setting the switch circuit into an OFF condition, sets so as not to supply the time out signal of the latency timer to the PCI sequencer. Thereby, the time out signal will not be supplied even if the latency timer is time out, so that the PCI sequencer can continue the data transmission processing successively; and thus the video data can be successively transmitted.

Incidentally, also when transmitting video data as heretofore, in the case of validating the time out of the latency timer, arbitration (the sequence of the request signal and the grant signal for it) should be conducted for every time out and moreover, the address data and the bus command should be supplied, thus the video data could not be efficiently transmitted. However, as this embodiment, in the case of invalidating the time out signal of the latency timer, the video data can be transmitted successively, thus the number times of the arbitration and the output number times of the address data and bus command can be decreased; and thus the video data can be efficiently transmitted.

Note that, since the PCI bus 6 according to this embodiment efficiently conducts the data transmission by invalidating the time out signal of the latency timer to realize high-speed transmission, the general purpose characteristic possessed by the PCI bus 6 will not be lost.

According to the construction described above, in the case where video data is transmitted using the PCI bus 6 as a bus for transmitting the video data, by invalidating the time out signal of the latency timer for counting the occupied time of the bus 6A by the switch circuit, the video data can be successively transmitted; and thus the video data can be efficiently transmitted to realize high-speed transmission.

Note that, in the aforementioned embodiment, the time out signal of the latency timer is invalidated by providing the switch circuit. The present invention, however, is not only limited to this but it can be arranged that the time out signal is supplied without providing the switch circuit in similar to the conventional device, and during transmitting the video data, the time out signal is ignored to invalidate the time out signal. In short, when transmitting the video data, by invalidating the time out signal of the timer for counting the occupied time of the bus, the similar effects to the case described above can be obtained.

Furthermore, in the aforementioned embodiment, the hard disk drive 3 is used as the recording/reproducing device of the video server device 1. The present invention, however, is not only limited to this but also the other recording/reproducing device, such as a video tape recorder and an magneto-optical disk device can be used as the recording/reproducing device.

Moreover, the aforementioned embodiment, the present invention is applied to the video server device 1. The present invention, however, is not only limited to this but also it can be widely applied to the other transmitting device as long as the device transmits video data.

According to the aforementioned transmitting device, server device, and transmitting method, when transmitting video data, by invalidating the time out signal of a timer for counting the occupied time of a bus, the video data having large volume of information can be successively transmitted by continuously using the bus; and thus the video data can be transmitted with high speed.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A transmitting device comprising:
   a bus formed by multiple signal lines;
   transmitting means for transmitting data over said bus;
   receiving means for receiving said data supplied via said bus; and
   a bus driver for coupling said transmitting means to said bus, said bus driver including a bus sequencer for transmitting and receiving data to/from said bus, a latency timer for generating a time-out signal for stopping transmission by said sequencer after a predetermined period of transmission has expired and for transmitting said time-out signal to said sequencer, and a switch for disabling transmission of said time-out signal to said sequencer in response to a disabling signal from said sequencer.

2. The transmitting device according to claim 1, wherein said bus is a bus based on the PCI standard.

3. A server device having a transmitting device, comprising:

a bus formed by multiple signal lines;

transmitting means for transmitting data over said bus;

receiving means for receiving said data supplied via said bus; and a bus driver for coupling said transmitting means to said bus, said bus driver including a bus sequencer for transmitting and receiving data to/from said bus, a latency timer for generating a time-out signal for stopping transmission by said sequencer after a predetermined period of transmission has expired and for transmitting said time-out signal to said sequencer, and a switch for disabling transmission of said time-out signal to said sequencer in response to a disabling signal from said sequencer.

4. The server device according to claim 3, wherein said bus is a bus based on the PCI standard.

5. A transmitting method of transmitting video data via a bus, comprising the steps of:

using a PCI bus as said bus;

transmitting said video data to said PCI bus via a PCI bus driver, said bus driver including a bus sequencer for transmitting and receiving data to/from said bus, a latency timer for generating a time-out signal for stopping transmission by said sequencer after a predetermined period of transmission has expired and for transmitting said time-out signal to said sequencer, and a switch for disabling transmission of said time-out signal; and when a disabling signal is generated by said sequencer, disabling transmission of said time-out signal to said sequencer by operation of said switch.

* * * * *